United States Patent [19]

Hoppe

[11] Patent Number: 5,327,788
[45] Date of Patent: Jul. 12, 1994

[54] ROTOR OPERATION IN A VORTEX CHAMBER FLOWMETER

[76] Inventor: David E. Hoppe, 217 Westerly Rd., Weston, Mass. 02193

[21] Appl. No.: 73,707
[22] Filed: Jun. 9, 1993
[51] Int. Cl.⁵ ............................................. G01F 1/20
[52] U.S. Cl. .................................. 73/861.33; 73/253
[58] Field of Search ............... 73/253, 255, 861.05, 73/861.32, 861.33, 861.79

[56] References Cited

U.S. PATENT DOCUMENTS

| | | | |
|---|---|---|---|
| 3,447,373 | 6/1969 | McNabb | 73/253 |
| 3,927,568 | 12/1975 | Hoppe | 73/861.33 |
| 4,015,474 | 4/1977 | Hoppe | 73/861.33 |
| 4,047,433 | 9/1977 | Dabanian | 73/861.33 |
| 4,433,583 | 2/1984 | Kirk | 73/861.33 |

FOREIGN PATENT DOCUMENTS 0091517  5/1986  Japan ................................. 73/253

Primary Examiner—Donald O. Woodiel
Assistant Examiner—William L. Oen
Attorney, Agent, or Firm—Robert P. Cogan

[57] ABSTRACT

In a vortex chamber flow meter, a bearingless annular rotor rotates about an axis in a cylindrical operating chamber. The chamber is enclosed in a jet ring within a meter housing. Liquid enters the housing and flows to a plurality of circumferentially spaced ports in the jet ring, directing flow through conduits into the vortex operating chamber tangentially. Liquid flow exits the vortex chamber axially through a central aperture. Optical sensing means respond to markings on the surface of a rotor moving past a selected position. The meter is constructed to effectively offset the entry of the liquid into the vortex chamber. The centerlines of the ports define a plane which is positioned to be off center from a plane bisecting the vortex chamber in the axial degree of freedom. The offset is in an axial direction away from the exit.

7 Claims, 1 Drawing Sheet

ROTOR OPERATION IN A VORTEX CHAMBER FLOWMETER

BACKGROUND OF THE INVENTION

The present invention relates to fluid flow meters having an annular rotor operating in a vortex chamber.

The present invention is particularly useful in the context of vortex flowmeters including a rotor that rotates without contact with other components. This operation is useful in applications in which rotor bearing drag can affect resolution or accuracy. Rotation of the rotor is sensed by transducer means.

In a vortex chamber flow meter, liquid flows into a meter housing. Within the housing is a component which may be described as a jet ring having a central cylindrical operating chamber therein. An annular rotor in the chamber is centrally positioned in operation by vortex flow. Liquid enters the jet ring through a plurality of ports each communicating with a conduit extending through the cylindrical wall of the jet ring. Conduits each direct flow into the chamber tangentially with respect to the rotor. Liquid exits axially from an aperture at the center of the chamber. The rotor rotates free of contact with the chamber, and rotation is monitored by transducer means such as optical sensing means responsive to movement of index marks on a surface of the rotor. The ports are equiangularly positioned around the periphery of the chamber.

Such a design has been successfully employed and has been considered to be satisfactory. It was not readily apparent to those skilled in the art that this operation could be improved upon.

SUMMARY OF THE INVENTION

It is a general object of the present invention to provide a vortex flow meter with modifications to improve operation.

It is a more specific object of the present invention to provide a vortex flow meter in which ports which direct fluid into an operating chamber are positioned to be off center in the axial direction with respect to the chamber.

Briefly stated, in accordance with the present invention, there is provided a vortex chamber flow meter wherein a bearingless annular rotor rotates about an axis in a cylindrical operating chamber. The chamber is enclosed in a jet ring within a meter housing. Liquid enters the housing and flows to a plurality of circumferentially spaced ports each communicating with a conduit in the wall of the jet ring. The conduits direct flow into the chamber tangentially with respect to the rotor. Liquid exits the chamber axially through a central exit port. Optical sensing means respond to index marks on a radial surface of the rotor moving past a particular angular position. The meter is constructed such that a plane defined by the centerline of the ports is positioned to be off center in the axial direction with respect to the chamber.

BRIEF DESCRIPTION OF THE DRAWINGS

The means by which the foregoing objects and features of invention are achieved are pointed out with particularity in the claims forming the concluding portion of the specification. The invention, both as to its organization and manner of operation, may be further understood by reference to the following description taken in connection with the following drawings.

Of the drawings.

DESCRIPTION OF THE PREFERRED EMBODIMENTS

Figure 1:
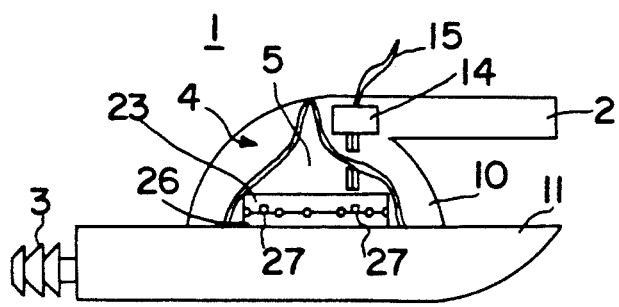
FIG. 1 is an elevation, partially broken away, of a vortex chamber flow meter constructed in accordance with the present invention.

FIG. 1 is an elevation, partially broken away, of a vortex chamber flow meter 1 constructed in accordance with the present invention. The flow meter 1 is a bearingless vortex chamber flow meter which may have any of a number of forms of outer envelope. Further prior art details of such a flow meter are disclosed in my U.S. Pat. No. 3,927,568 issued Dec. 23, 1975, entitled Means for Improving Linearity of Bearingless Flowmeter Having Ring-Shaped Rotor Operating in Combination with a Vortex Chamber by Controlling Turbulence Produced by Jet Pathways and my U.S. Pat. No. 4,015,474, issued Apr. 5, 1977 and entitled Stabilizing Means for Rotor of Bearingless Flowmeter, the disclosures of which are incorporated herein by reference.

The flow meter 1 has an inlet 2 and an outlet 3 communicating with a housing 4 having an interior 5. The housing 4 may be constructed as in my prior above-cited patents. The housing 4 may be machined. Alternatively, in accordance with one form of the present invention, the housing 4 is comprised of molded upper and lower portions 10 and 11. A "housing" here need not comprise a closed container. It comprises means for interposing a jet ring (described below) between an inlet source and an output. The terms upper and lower are used relatively, and are arbitrary. The top and bottom portions discussed could have their positions reversed.

In the present embodiment, optical response means 14, further described below, comprises transducer means and also includes light conducting means which extend from the inside of the top half 10 to the outside of the top half 10. The optical response means 14 includes electrical leads 15 for interfacing the pump 1 to utilization means (not shown). In the present embodiment, the chamber 5 comprises the interior of the upper portion 10 and has a planar lower surface closed by the lower portion 11. Liquid enters the housing 4 and flows from the chamber 5 to the components next described.

Figure 2:
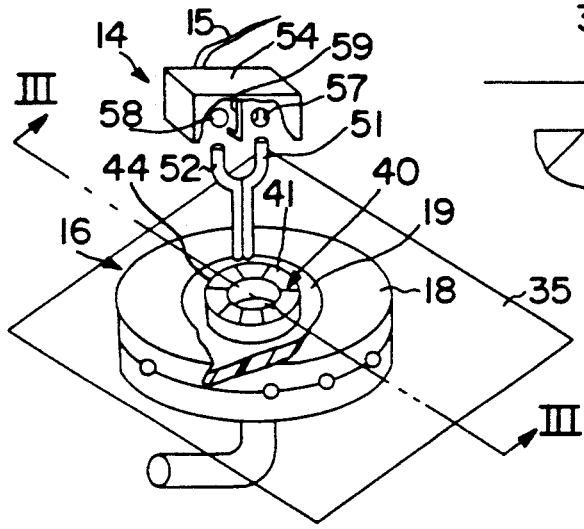
FIG. 2 is an axonometric view, partially broken away, illustrating a jet ring and rotor.
Figure 3:
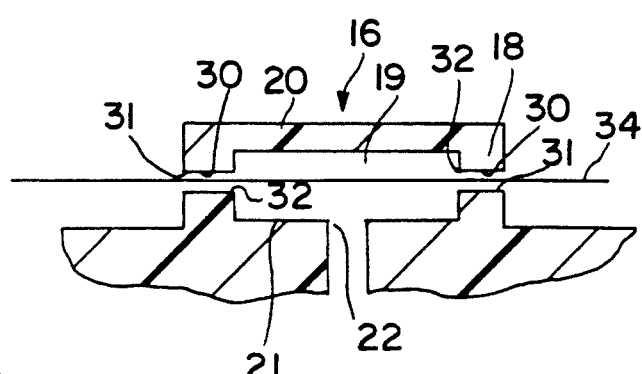
FIG. 3 is a cross sectional view taken along lines III—III FIG. 2.

The chamber 5 surrounds a jet ring 16 which is a closed structure, with inlet and outlet means as described below with respect to FIGS. 2 and 3. FIG. 2 is an axonometric view, partially broken away, illustrating a jet ring 16 and rotor 40. FIG. 3 is a cross sectional view taken along lines III—III FIG. 2. The jet ring 16 may also be viewed as an annular member 18 surrounding a central operating chamber 19. The annular member 18 is closed at an upper axial end by a circular cover 20 and at a lower axial end by a cover 21 having a central outlet 22. The jet ring 16 need not be actually constructed of separate members to comprise each element stated above. They may be integrally formed. In the present embodiment, a top portion 23 (FIG. 1) of the jet ring 16 is molded integrally with the top 10 of the housing 4, and a lower portion 26 of the jet ring 16 is molded integrally with the lower portion 11 of the housing 16. The lower portion 26 may include locator pins 27 and other conventional means for assuring that the portions 23 and 26 reliably snap together.

The jet ring 16 further comprises a plurality of conduits 30 for communicating the chamber 5 with the central operating chamber 19. Each conduit has an inlet port 31 and and outlet port 32 at the chambers 5 and 19 respectively. The conduits 30 are disposed to provide for tangential flow within the central operating chamber 19. In the preferred embodiment there are twelve conduits 30, which are equiangularly spaced. More or fewer conduits 30 may be provided. The conduits 30 each have an axis 34 (FIG. 3) disposed in a substantially radial plane 35 (FIG. 2). The axes 34 also comprise centerlines of the inlet ports 31. In the present embodiment, the interface of the upper and lower portions 23 and 26 of the jet ring 16 intersects the conduits 16 at the plane 35.

The rotor 40 comprises an annular member, preferably of substantially rectangular cross section and having an upper radial surface 41. The upper radial surface 41 comprises marks 44 equiangularly spaced thereon. The housing 4 is constructed such that the optical sensing means 14 are in registration with a preselected angular position of the rotor 40. Consequently, the optical sensing means 14 can respond to movement of a mark 44 past the preselected angular position to provide intelligence indicative of rotation of the rotor 40.

The optical sensing means 14 is further described with respect to FIG. 2. First and second light pipes 51 and 52 extend into the jet ring 16 to each have an end in registration with the surface of the rotor 40 bearing the marks 44. In the illustrated embodiment, this is the surface 41. The light pipes 51 and 52 terminate outside the housing 4, and removably receive an interface connector head 54. The interface connector head 54 is preferably formed to receive the remote ends of the light pipes 51 and 52. In the connector head 54, a photodetector 58 and a light source 57 are separated by a baffle 59. The light source 57 is illustrated as a lamp, but may comprise a light emitting diode or other suitable source. Light is piped in to the chamber 19 by the pipe 51. The marks 44 are reflective. As each mark 44 passes in registration with an end of the light pipe 51, light is reflected to and directed through the light pipe 52 to the photodetector 58 to produce a pulse of intelligence indicative of rotation.

Figure 4:
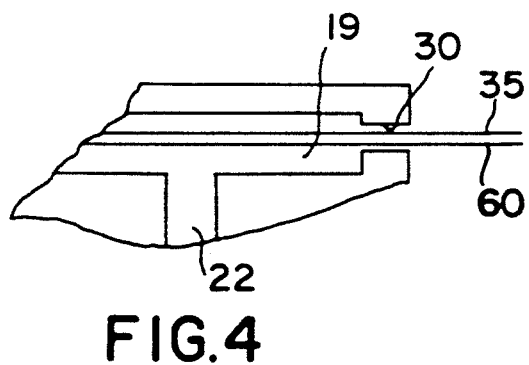
FIG. 4 is a partial detail of FIG. 3.

FIG. 4 is a partial detail view of FIG. 3 with reference lines as described below superimposed thereon. Further in accordance with the present invention, the meter 1 is constructed such that the plane 35 is positioned to be off an axial center line 60 extending in the axial direction with respect to the operating chamber 19. It has been found that this improves stability of the rotor 40. It has also been found to improve linearity by significantly enhancing the constancy of the K factor over a wide range of flow regimes. The K factor relates to the number of output pulses produced per unit of flow volume. The centerline 60 represents an axial centerline of the operating chamber 19. The conduits 30 are formed such that the plane 35 is displaced from the chamber axial centerline 60 in a direction away from the outlet 22. A preferred range of proportion of axial distance of the plane 35 in the axial direction compared to the total axial dimension of the chamber 19 is 70 to 75%.

Figure 5:
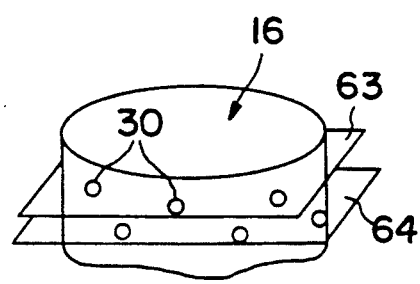
FIG. 5 is an axonometric view of a further form of jet ring.

FIG. 5 is an axonometric illustration of a further form of jet ring 16. A plurality of conduits 30 are provided, groups of which have centerlines on each of first and second planes 63 and 64. These conduits 30 define an effective offset of flow with respect to the operating chamber 19, which is equivalent to having axes 34 of conduits 30 in the plane 35.

In one embodiment, the operating chamber 19 has an axial dimension of 0.066 inches. The preferred offset has been found to be in the range of 0.001 to 0.012 inches. For purposes of the present description, an offset percentage will be expressed as the proportion of offset to axial dimension of the operating chamber 19. Thus a preferred range of offset percentage for the present embodiment would be 1½% to 18%. It has been discovered that operation in this range is materially superior to performance of an unspecified offset in the direction away from the exit aperture 22.

The flowmeter 1 may be embodied in any of a number of ways. Outer envelope shapes and various dimensions may be varied within the context of a vortex chamber flowmeter with bearingless rotor. The present specification will enable those skilled in the art to make many modifications in the particular embodiments described herein to provide a flow meter constructed in accordance with the teachings herein,

What is claimed as new and desired to be secured by Letters Patent of the United States is:

1. A vortex chamber flowmeter comprising housing means having an inlet communicating with a first chamber, a jet ring positioned in said chamber and mounted in a fixed spatial relationship to said housing, said jet ring comprising an internal operating chamber surrounding an axis and having a centerline at an axial midpoint of the internal operating chamber and extending in a radial direction, a bearingless rotor positioned in the internal operating chamber for rotation about the axis, the internal operating chamber having an outlet at an axial end thereof, inlet conduits formed in said jet ring providing fluid communication between the first chamber and the internal operating chamber in a radial direction and providing for tangential fluid flow within the internal operating chamber, said conduits having ports with centerlines defining an effective plane, said flow meter being constructed such that the intersection of said axis with said plane is axially displaced from the intersection of said axis with said internal operating chamber centerline in an axial direction away from the outlet a distance of 1 ½% to 18% of the axial dimension of the internal operating chamber, whereby stability of said rotor is improved.

2. The flowmeter according to claim 1 wherein said rotor comprises index markings for sensing by optical means and wherein said housing comprises optical response means extending into said internal operating chamber in registration with a preselected angular position of said rotor.

3. The flowmeter according to claim 2 wherein said optical sensing means comprises light pipes having ends adjacent a surface of the rotor bearing said index markings, said housing further comprising connector head means releasably connected to said light pipes and including a light source and light detector, each for cooperation with one of said light pipes, and electrical leads for connection to a utilization means.

4. The flowmeter according to claim 2 wherein said jet ring is formed of upper and lower mating halves and the interface between the halves lies on said plane.

5. The flowmeter according to claim 4 wherein said housing is formed of upper and lower molded mating halves and wherein said upper and lower halves of said jet ring are integrally formed with said upper and lower halves of said housing respectively.

6. The flowmeter according to claim 3 wherein said housing is formed of upper and lower molded mating halves and wherein said upper and lower halves of said jet ring are integrally formed with said upper and lower halves of said housing respectively.

7. The flowmeter according to claim 1 wherein said plane is an effective plane defined conduits having centerlines in more than one plane.

* * * * *